Sept. 16, 1924.

E. N. MAZZA 1,508,405

METHOD AND MEANS FOR SEPARATING GASES OR THE LIKE

Original Filed July 9, 1920   4 Sheets-Sheet 1

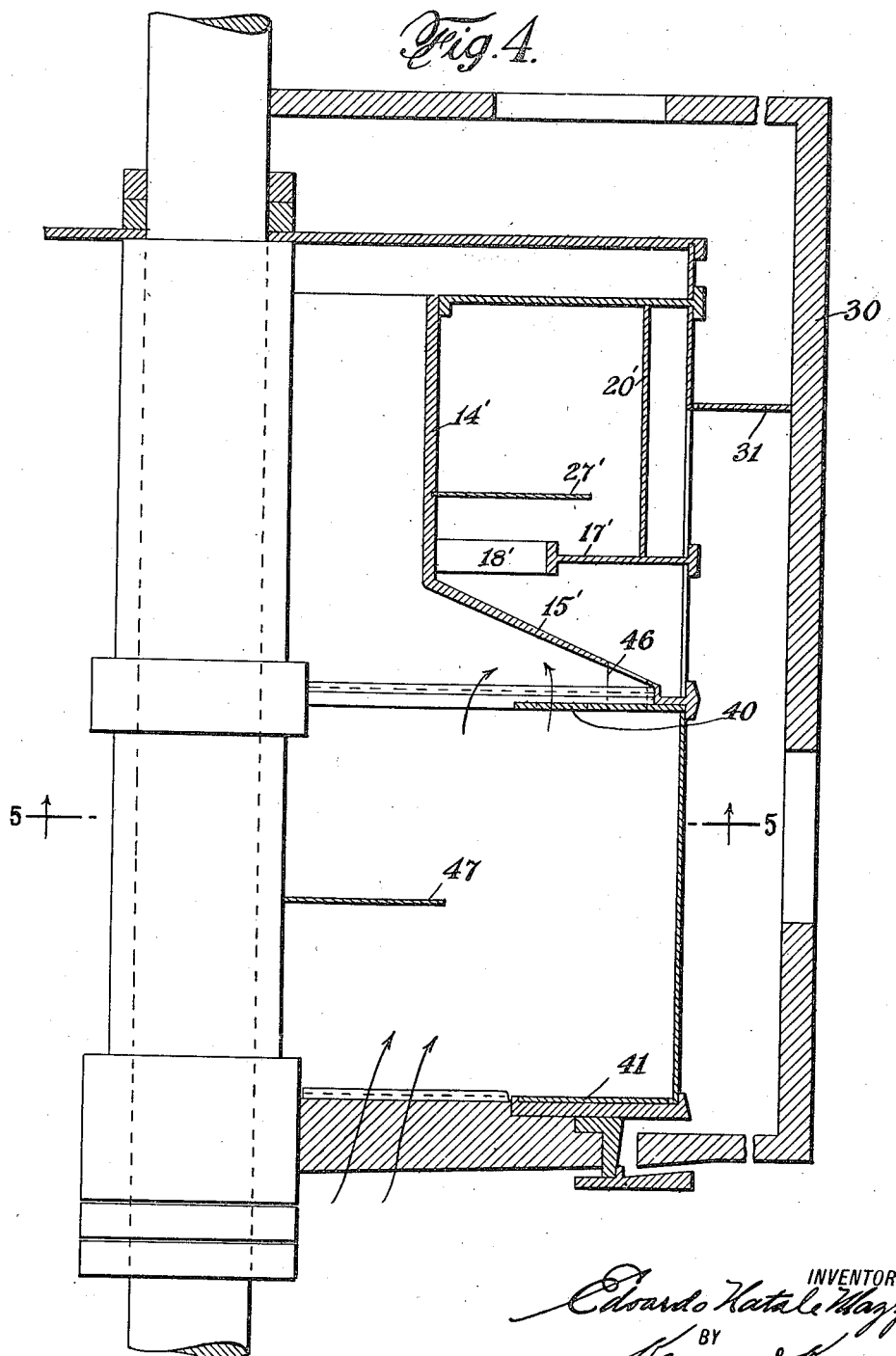

Sept. 16, 1924.    1,508,405
E. N. MAZZA
METHOD AND MEANS FOR SEPARATING GASES OR THE LIKE
Original filed July 9, 1920    4 Sheets-Sheet 4
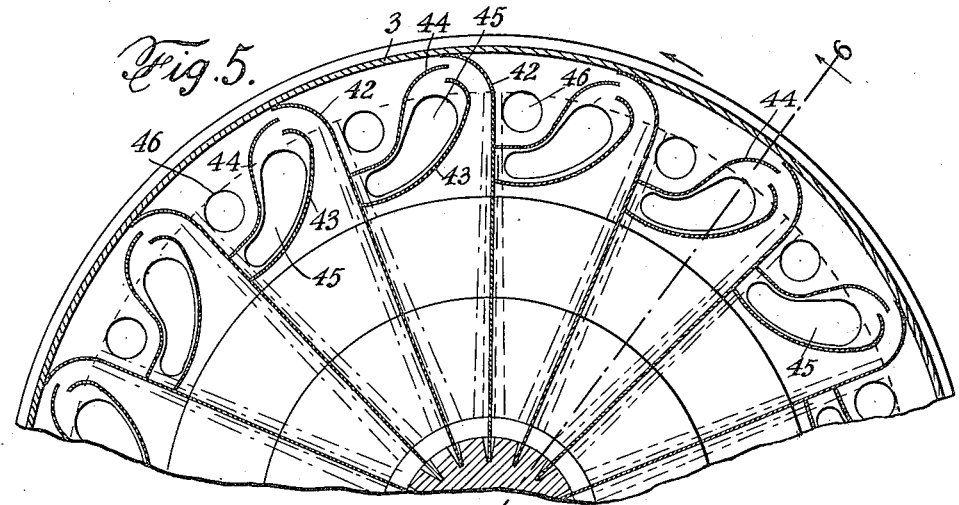
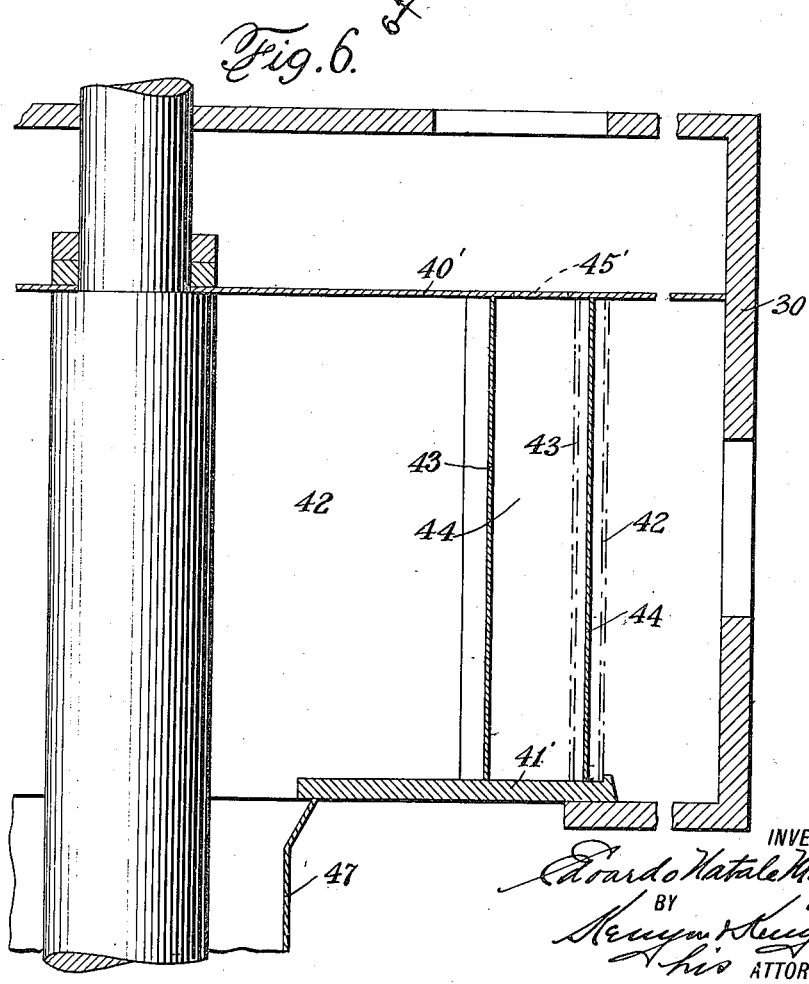
INVENTOR
Edoardo Natale Mazza
BY
his ATTORNEYS Patented Sept. 16, 1924.

1,508,405

UNITED STATES PATENT OFFICE.

EDOARDO NATALE MAZZA, OF TURIN, ITALY, ASSIGNOR, BY MESNE ASSIGNMENTS, TO THE A. F. SYNDICATE, OF NEW YORK, N. Y.

METHOD AND MEANS FOR SEPARATING GASES OR THE LIKE.

Application filed July 9, 1920, Serial No. 395,029. Renewed July 19, 1924.

(GRANTED UNDER THE PROVISIONS OF THE ACT OF MARCH 3, 1921, 41 STAT. L., 1313.)

*To all whom it may concern:*

Be it known that I, EDOARDO NATALE MAZZA, a subject of the King of Italy, and a resident of Turin, Italy, have invented certain Improvements in Methods and Means for Separating Gases or the like (for which I have filed applications in Italy Sept. 7, 1915, Reg. No. 150,603; Jan. 23, 1918, Reg. No. 165,354; Oct. 23, 1919, No. 37,439; Feb. 28, 1920, No. 38,218; June 23, 1920, No. 39,006; and in England July 7, 1920, No. 19,256; and in Luxembourg July 8, 1920, No. 11,838), of which the following is a specification.

This invention relates to a method and means for the separation or partial separation by the employment of centrifugal force of constituents of different specific gravities in mixtures of gases and of gases with other suitable substances, some of which will be mentioned hereinafter. The movement of such a mixture for obtaining the necessary centrifugal force to effect separation of constituents thereof may be obtained by rotating the mixture, as by causing it to pass through a rapidly rotating apparatus, as shown for example in my United States Patent No. 940,885, or by causing the gas to flow at sufficient velocity in a sharply curved path, as shown in my United States Patent No. 1,137,774. In some cases where the difference in density of the components of the mixture is small or a relatively high degree of separation is desired, or both, it would be necessary to give the apparatus of the rotatable type referred to such a high peripheral speed as to be incompatible with the resistance of the materials of which such apparatus is made. In causing the gas to flow in a curved path, there are practical limits to the velocity obtainable for the mixture by the expansion of the mixture as described in the said Patent No. 1,137,774. I have found that a materially higher degree of separation is obtainable and in a more satisfactory manner than heretofore and without excessive peripheral speed of the apparatus even in cases where the difference in density of the components of the mixture is small, by rotating the gas or mixture in suitable rotatable apparatus, such as a drum, and at the same time causing it to flow under a suitable difference of pressure in a sharply curved path during such rotation, there being thus a cumulative action of the centrifugal force developed from the kinetic energy due to the rotation of the mixture and the centrifugal force developed through the passage of the mixture in a sharply curved path upon the conversion of potential or pressure energy of the mixture into kinetic energy.

An even higher degree of separation has been found obtainable without any increased tangential velocity of the apparatus or any increase in the velocity of the expanding gas by subjecting the separated constituent to further centrifugal action before it has come to rest.

My invention will be readily understood from the above and from the following detailed description of several embodiments of my invention, attention being directed to the accompanying drawings forming a part of this specification.

In the drawings,

Fig. 4 is an axial sectional view similar to Fig. 1, of the second embodiment of the invention.

Fig. 5 is a partial sectional view on line 5—5 of Fig. 4, and

Fig. 6 is an axial sectional view similar to Fig. 4 of another embodiment of the invention.

Figure 1:
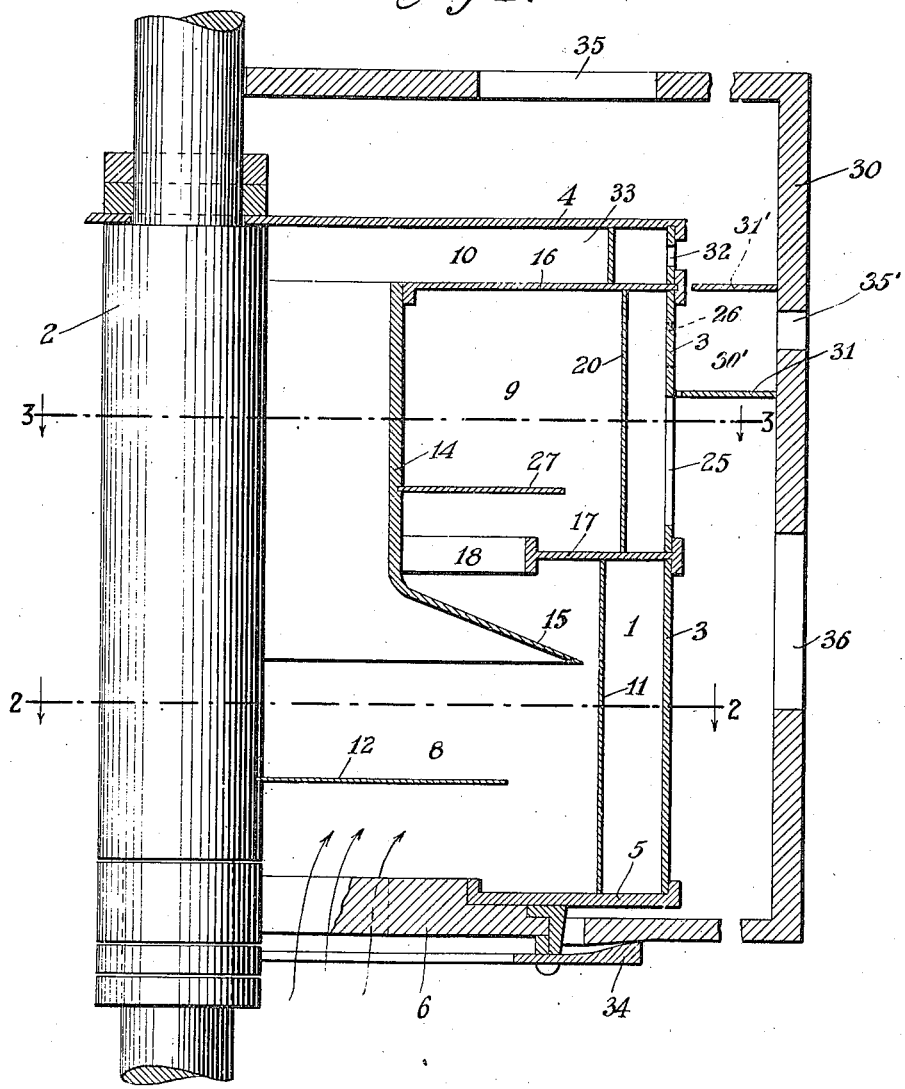
Fig. 1 is an axial sectional view showing the apparatus on one side of the axis of rotation of the drum.
Figure 2:
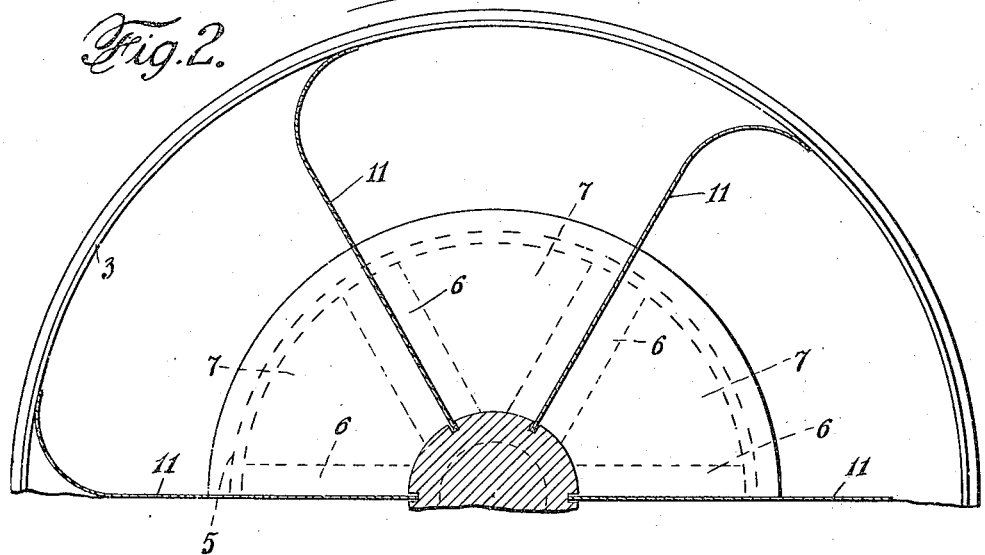
Fig. 2 is a partial section of the drum taken on line 2—2 of Fig. 1.
Figure 3:
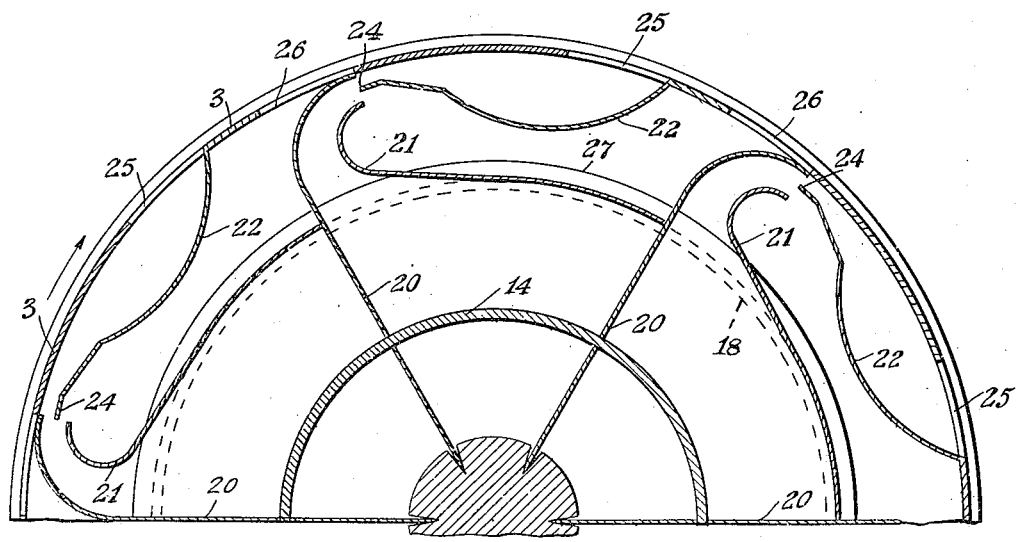
Fig. 3 is a partial section of the drum taken on line 3—3 of Fig. 1.

Referring to Figs. 1, 2 and 3, the separator comprises a rotary member or drum 1 which is supported for rotation on a shaft 2. The drum has an outer or peripheral wall 3 which, as shown, is cylindrical in shape and co-axial with the shaft 2. End walls 4 and 5 are arranged respectively at the upper and lower ends of the wall 3. The wall 4 as shown extends from the peripheral wall 3 to the shaft 2 and forms a closure for the upper end of the drum. The wall 5 is supported by spokes or arms 6 (see Figs. 1 and 2) which extend outwardly from the shaft 2 and rotate therewith. By this arrangement there are provided between the spokes or arms 6 and the wall 5 a number of spaces or openings 7 (see Fig. 2) through which the mixture, such as air from the surrounding atmosphere or from any other suitable source, may enter the lower end of the drum.

The drum, as shown in Figs. 1, 2 and 3, is formed with a lower section 8, an intermediate section 9 and an upper section 10. The lower section is formed with a number of vertical partitions 11 which extend outwardly from the shaft 2 to the wall 3 and rotate with the drum. As shown, these partitions are arranged radially with respect to the drum from the shaft 2 to a point in proximity to the wall 3, the outer ends of the partitions being curved so that the air or other fluid which moves outwardly towards the periphery of the drum during the rotation thereof will be gradually deflected upon its outward movement. To insure the flow of the gas or other fluid outwardly towards the periphery of the drum, the lower section of the drum is provided with a baffle 12 which, as shown, is in the form of a horizontal disc 12 carried by the shaft 2.

A conduit 14 is provided for leading off the constituents of lesser density from those of greater density after the action of the lower section 8 of the drum upon the mixture. This conduit, as shown, is formed with an upper cylindrical portion leading into the upper section 10 of the drum and with a lower portion 15 flaring outwardly and downwardly to a point below the upper edges of the partitions 11, the outer edge of the portion 15 being spaced a predetermined distance inwardly of the peripheral wall 3 of the drum. The intermediate section 9 of the drum has an upper horizontal wall 16 which separates it from the upper section 10 and forms a closure for the upper end of the section 9 and a lower horizontal wall 17. The latter wall is, as shown, in the form of a ring which extends from the wall 3 towards the lower cylindrical portion of the conduit 14, being spaced from the latter so as to provide a passage 18 into the lower end of the intermediate compartment or section 9. The latter contains a number of vertical partitions which are clearly shown in Fig. 3. These vertical partitions include a plurality of walls 20 which extend outwardly from the conduit 14 to the peripheral wall 3 of the drum. These walls 20, as shown, have radial inner portions and outer portions curved forwardly towards the direction of rotation of the drum, which is shown by the arrow. Coacting with each of walls 20 is another partition or wall 21 which forms with the wall 20 and the horizontal partitions 16 and 17 a gradually converging conduit or passage for the mixture to be separated. The walls 21, as shown, have their inner ends arranged concentrically with the conduit 14 and the inner portions of the walls 21 approach walls 20 considerably more rapidly than do the outer portions thereof. I have found that best results are obtained when the curved outer portions of the walls 20 and 21 are curved on arcs of circles. I have also found that for practical purposes the radii of the arcs on which the walls 20 and 21 are curved should not exceed a certain amount, preferably not more than 4.5 inches. Generally the mean radius of curvature of the passage between walls 20 and 21 should in apparatus for the reduction of the percentage of nitrogen in the air not exceed one inch. The width of the passage between the walls 21 and 20 should also not be more than a certain relatively small amount, preferably not more than one inch. If the width is too great, the major part of the molecules of gas passing through the curved conduit or passage formed by the said walls 20 and 21 do not have time to move outwardly from the inner zone adjacent the wall 21 to the outer zone adjacent the wall 20 before they are discharged from the passage, so that the resulting centrifugation is not attained to the desired extent. I have found in practice that with the best present form of apparatus for separating nitrogen from air the width of the outer opening between the walls 20 and 21 may desirably be .6 and .7 of an inch, the taper of the passages between the walls 20 and 21 desirably being quite gradual.

The intermediate compartment also contains members between walls 21 and wall 3, such as the walls 22, for separately leading off constituents of different densities which have been subjected to centrifugal force. The vertical walls 22, like the walls 20 and 21, extend the full vertical distance between the partitions 16 and 17 and have vertical edge portions 24 which are arranged in proximity to the outlet of the passages between the walls 20 and 21 and between the side walls of said passages. The walls 22 are accordingly arranged to separate constituents of the original mixture at different distances from the axis of rotation of the drum and also at different distances from the center of curvature of the passages between the walls 20 and 21. The walls or partitions 22 extend from edge 24 horizontally to the peripheral wall 3 of the drum. The separated constituents or portions of the mixture are separately discharged from the drum, the heavier constituents or portions passing out through ports or windows 25 in the peripheral wall of the drum, and the lighter constituents or portions passing out of the drum through ports or windows 26 in the said wall 3. Furthermore, the position of ports or windows 25 must be entirely below the lower edges of the ports or windows 26. It is desirable that a baffle 27 in the form of a horizontal disc carried by the member 14 be employed to compel the passage of the gas outwardly to the curved conduits between walls 20 and 21.

Referring to Fig. 1, a stationary outer casing 30 surrounds the drum. This casing has a partition 31 which extends from the outer wall of the casing 30 to a point in close proximity to the wall 3 of the drum at a horizontal position intermediate the partitions 16 and 17 and between the ports 25 and 26. The ports or windows 25 are arranged entirely below the partition 31 and the ports or windows 26 are arranged entirely above the partition 31; so that the lighter constituents are discharged in the portion of the casing 30 above and the heavier constituents in the portion of the said casing below the horizontal partition 31.

The uppermost section 10 of the drum is, as shown, provided in its peripheral wall 3 with ports or windows 32 through which the lightest constituents of the mixture, which have been separated in the lower section 8 of the drum, pass into the portion of the casing 30 above the partition 31. The lighter constituents discharged from the intermediate section 9 of the drum pass through the windows 26 into a portion 30′ of the casing between partition 31 and a position 31′ at a higher level, an opening 35′ being provided to permit these constituents to be led from casing 3 separated from the other constituents. The uppermost section 10 of the drum is provided with outwardly extending partitions 33, which may be arranged like the partition 11 in the lower section 8 of the drum. The lower wall of casing 30 is desirably spaced outwardly of the drum a suitable distance, as shown in Fig. 1; and a sealing member 34, which is shown in the form of a ring secured to the drum and arranged in proximity to the lower face of the bottom wall of the casing 30, tends to prevent leakage of the fluid out of the lower part of the casing 30. The body of the fluid between the sealing member 34 and the member 5 has imparted to it centrifugal force which tends to move said body of fluid outwardly, thereby counter-balancing any tendency of the fluid in the casing 30 below the partition 31 to escape from the bottom of the casing and at the same time to prevent the air from the surrounding atmosphere entering the casing. The constituents respectively in the upper and lower portions of the casing 30 may be separately led off through openings 35 and 36 respectively in the upper wall of the casing and the lower portion of the side wall thereof.

In operation, the drum is caused to rotate at a high speed which may desirably be from 75 feet to 600 feet per second tangential velocity for the increase of the percentage of oxygen in the air with the device shown in Figs. 1, 2 and 3. The rotation of the partition walls 33 in the upper section 10 of the drum tends to create a suction which facilitates the flow of the mixture, such as air or other gases, into the lower end of the drum through the openings 7. (See Fig. 2.) The mixture is first set into rotation at a high speed by means of the partition walls 11 in the lower section of the drum and tends to move outwardly towards the periphery of the drum not only because of the centrifugal force applied to the mixture but also because of the deflection by the baffle 12. The centrifugal force imparted to the denser or heavier portions of the mixture is greater than that imparted to the lighter or less dense portions, so that the heavier or denser portions tend to assume a position nearer the peripheral wall of the drum than the lighter or less dense portions. Accordingly as the heavier and lighter portions pass upwardly in the drum, the conduit 14, 15 leads the lighter or less dense portion upwardly into the upper section 10 of the drum whence it is discharged into the upper portion of the casing 30, while the heavier or denser portion of the mixture is led into section 9 of the drum, being deflected slightly inwardly by the horizontal wall 17 and passing into the said intermediate section through the opening 18.

The portion of the mixture in this intermediate section of the drum has imparted thereto before the rotation thereof ceases or diminishes materially a centrifugal force due not only to the rotation of the mixture at high speed about the axis of the drum but also due to the movement of the fluid at a high velocity in a sharply curved path in passing through the passages between the walls 20 and 21. This high velocity, which for increasing the percentage of oxygen in the air should desirably be at least 75 feet per second, results from the fact that the heavier gas is discharged from the lower section 8 into the intermediate section 9 at a substantial pressure which is considerably greater than the pressure in the lower portion of the stationary casing 30. The velocity decreases gradually as the fluid passes through the said passages and increases in density and pressure. By augmenting the centrifugal force due to the rotation of the drum and mixture with centrifugal force due to the movement of the fluid through the curved passages between the walls 20 and 21, due to the transformation of the potential energy into kinetic energy, a high degree of separation of the heavier from the lighter constituents of the mixture is obtainable even where the constituents do not vary greatly in specific gravity, and without an excess peripheral speed of the drum. With the invention as disclosed, the separation of the heavier from the lighter constituents of the mixture is still further facilitated without increasing the speed of the drum by reason of the repetition in the intermediate section 9 of the centrifugation and separation after an initial centrifugation and separation in the lower section 8. The heavier portions of the mixture are, as heretofore explained, discharged through the ports or windows 25 to the lower portion of the casing 30 while the lighter portions are discharged through the ports or windows 26 into the upper portion of the casing 30. By means of the device and process above described a continuous supply of the mixture is fed to the apparatus and the separated portions of the mixture may be continuously discharged therefrom during the rotation of the drum.

The invention is adapted for the separation of constituents of many different kinds of mixtures, among which may be mentioned the previously suggested mixture of oxygen and nitrogen in the atmosphere. Oxygen, as well known, has a somewhat greater specific gravity than nitrogen; and by properly designing the apparatus and carrying on the process, mixtures of oxygen and nitrogen in the portions varying at will, may be obtained in accordance with the various requirements of manufacturing and in desired amounts. Carbon dioxid, carbon monoxid, hydrogen, hydrocarbon, aqueous vapors, sulphuric acid gas, nitrous oxid gas argon, ozone and nitrogen may also be separated from gaseous vapors or aeroform mixtures containing them. Other uses of the invention will readily appear to those skilled in the art.

In the embodiment of the invention shown in Figs. 4 and 5 the intermediate and upper sections of the drum and the casing 30 are the same as in Figs. 1 and 3. The lower section of the drum is, however, designed to employ centrifugal force for the separation of constituents of the mixture to a greater extent than with the device of Figs. 1 to 3 and to obtain the heavier product more completely separated from the lighter products than is secured with the device of said last-named figures. In Fig. 4 the lowermost section of the drum is provided with an upper horizontal wall 40 and a lower horizontal wall 41 between which are arranged a plurality of sets of partition walls 42, 43 and 44. The walls 42 and 43 are similar in arrangement and the same in function as the walls 20 and 21 of Fig. 3. There are, however, a greater number of sets of such walls in Fig. 5 than in Fig. 3, and the inner ends of the walls 44 as well as the inner ends of the walls 43 contact with adjacent walls 42. The walls 44 are for the purpose of separating the heavier from the lighter products resulting from the centrifugation in the lowermost section of the drum and correspond in function and in general arrangement with the walls 22 of Fig. 3. Each pair of walls 43 and 44, together with an adjacent wall 42 and the upper and lower partitions 40 and 41, form a chamber through which the lighter products resulting from the centrifugation in the lower section of the drum are discharged, these chambers communicating through openings 45 (see Fig. 5) in the upper partition wall 40 with the interior of the conduit 14'. The heavier products resulting from the centrifugation in the lower section of the drum pass into chambers between the peripheral wall 3, the wall 44 and adjacent wall 42. These chambers discharge by means of tubular conduits 46 (see Figs. 4 and 5) into the space in the drum outside of the conduit 14'. The latter, as shown in Fig. 4, has its lower flaring portion extending into close proximity to the peripheral wall of the drum and the conduits 46 extend through the said lower flaring portion 15' thereof. A horizontal baffle 47 is provided to deflect the mixture to be centrifugated outwardly towards the periphery of the lower section of the drum. The wall 40 is, as shown, in the form of a ring so that the lightest portion of the mixture can pass upwardly into the conduit 14' without passing through the passages between the walls 42 and 43.

In the embodiment of the invention last described, the lightest portion of the mixture will, as stated, pass upwardly into the conduit 14' without passing through the passage between walls 42 and 43, while the remainder of the mixture is subjected to a centrifugal action in which the centrifugal force is obtained not only by rotation of the mixture but also by the passage of the constituents at a high velocity due to the transformation of the potential into kinetic energy in a sharply curved converging path between the walls 42 and 43. There are accordingly obtained in the lower section of the drum two effective separations of the mixture, the second into a lighter portion which passes upwardly into the conduit 14 and a heavier portion which passes through the conduits 46 into the intermediate section of the drum where it is again subjected to centrifugal action and where a further separation is effected, as described in connection with Figs. 1 and 3. In the form of invention as shown, only the heaviest portion of the mixture passes into the lower portion of the casing 30 below wall 31 while all the other portions pass into the upper portion of the casing 30 above the said wall 31. Of course, the various portions of the mixture may be led off or stored in a different manner, if desired.

In Fig. 6 I have shown a form of apparatus employing vertical partition walls such as shown at 42, 43 and 44, Fig. 5 (see line 6—6), for separating the heavier and lighter portions of the mixture without moving the apparatus, namely, by the transformation of potential into kinetic energy. In this case, the walls 42, 43 and 44 are arranged between horizontal partition walls 40' and 41', the former wall extending entirely across the stationary outer casing 30, and being provided with openings 45' similar to the openings 45 of Fig. 5, whereby the lighter constituents or portions of the mixture are discharged from the chambers between the walls 43, 44 and the adjacent walls 42 (see Fig. 5) into the upper portion of the casing 30. There is in Fig. 6 no peripheral wall corresponding to the wall 3 of Figs. 1 to 5, the heavier constituents or portions of the mixture being discharged directly into the lower portion of the casing 30. A suitable conduit 47 is employed to convey the mixture to be treated under pressure into the lower central portion of the apparatus. In operation, the mixture under the difference in pressure between the fluid in the passage 47 and the fluid in the casing 30 passes at a high velocity through the sharply curved passage between the walls 42 and 43, the potential energy of the mixture being converted into kinetic energy, and the centrifugal force imparted to the mixture causes it to separate, as already described, to cause the lighter constituents or portion to pass into the upper portion of the casing 30 and the heavier constituents or portion into the lower portion of the said casing.

It is to be understood that my invention is not limited to the separation of the mixture in a plurality of stages as described and shown in Figs. 1 to 5 inclusive, and that many other changes may be made without departing from the invention and the scope of the appended claims.

Having thus described my invention, what I claim and desire to secure by Letters Patent is:—

1. The process of separating constituents of a mixture of gases or of gas with other substances which comprises subjecting the mixture to centrifugal force by rotating the same to separate the mixture into portions having different specific gravities, leading off one of said portions to separate it from another of said portions of greater specific gravity, subjecting said last named portion to further centrifugal force by maintaining the same in rotation and simultaneously gradually converting potential energy of said last named portion into kinetic energy and causing said last named portion to flow in a sharply curved path at a high velocity to separate said last named portion into portions having different specific gravities.

2. The process of separating constituents of a mixture of gases or of gas with other substances which comprises subjecting the mixture to centrifugal force by rotating the same to separate it into portions having different specific gravities, leading off one of said portions to separate it from another of said portions which has a different specific gravity, subjecting said last named portion to further centrifugal force by maintaining the same in rotation and simultaneously causing it to flow at a high velocity in a sharply curved path to separate the same into portions having different specific gravities, and subjecting the one of the last named portions which has the greatest specific gravity to further centrifugal action to separate portions thereof of different specific gravities.

3. The combination of a rotatable member provided with a conduit through which a mixture of gases or other suitable substances to be separated is adapted to be passed at a high velocity to impart centrifugal force thereto, said conduit having a longitudinally curved outlet portion and extending outwardly with respect to the axis of rotation of said member and being of diminishing cross section towards its outlet, and means for separating portions of the substances delivered by the conduit at different distances from the centre of curvature of the conduit.

4. The combination of a rotatable member provided with a plurality of longitudinally curved conduits through which a mixture of gases or other suitable substances to be separated is adapted to be passed under a difference in pressure to impart centrifugal force thereto, said conduits extending outwardly with respect to the axis of rotation of said member and being of diminishing cross section towards their outlets, means for creating a difference in pressure between the inlets and outlets of said conduits, and means for separating portions of the substances delivered by the conduits at different distances from the respective centres of curvature of the conduits.

5. The combination of a rotatable member provided with a plurality of conduits through which a mixture of gases or other suitable substances to be separated is adapted to be passed under a difference in pressure to impart centrifugal force thereto, said conduits extending outwardly with respect to the axis of rotation of said member, being of diminishing cross section towards their outlets and having outlet portions provided with opposite walls curved longitudinally on arcs of circles, and means for separating portions of the substances delivered by the conduits at different distances from the respective centres of curvature of the outlet portions of the conduits.

6. The combination of a rotatable member provided with a plurality of conduits through which a mixture of gases or other suitable substances to be separated is adapted to be passed under a difference in pressure to impart centrifugal force thereto, said conduits extending outwardly with respect to the axis of rotation of said member and being of diminishing cross section towards their outlets and longitudinally curved adjacent their outlets, said rotatable member having also means for directing the substances to be separated outwardly towards the inlets of said conduits, and means for separating portions of the substances delivered by the conduits at different distances from the respective centres of curvature of the conduits.

7. The combination of a rotatable member provided with a plurality of longitudinally curved conduits through which a mixture of gases or other suitable substances to be separated is adapted to be passed to impart centrifugal force thereto, said conduits extending outwardly with respect to the axis of rotation of said member and being of diminishing cross section towards their outlets, said rotatable member having also means including a baffle extending transversely of said axis for directing the substances to be separated outwardly towards the inlets of said conduits, and means for separating portions of the substances delivered by the conduits at different distances from the respective centres of curvature of the conduits.

8. The combination of a rotatable member provided with a plurality of longitudinally curved conduits through which a mixture of gases or other suitable substances to be separated is adapted to be passed to impart centrifugal force thereto, said conduits extending outwardly with respect to the axis of rotation of said member and being of diminishing cross section towards their outlets, said rotatable member having also means including a baffle extending transversely of said axis and coacting with the inner portion of walls of said conduits for directing the substances to be separated outwardly towards the inlets of said conduits, and means for separating portions of the substances delivered by the conduits at different distances from the respective centres of curvature of the conduits.

9. The combination of a rotatable member provided with a plurality of longitudinally sharply curved conduits through which a mixture of gases or of gas with other substances is adapted to be passed to impart centrifugal force thereto, said conduits extending outwardly with respect to the axis of rotation of said member, means arranged to one side of said conduits for creating a difference in pressure between the inlets and the outlets of said conduits, and means for separating portions of the substances delivered by the conduits at different distances from the respective centres of curvature of the conduits.

10. In a centrifugal separator, a rotatable drum provided with means for subjecting a mixture of gases or the like to centrifugal force, means including a hollow conduit arrange axially of the drum and a suction producing device in operative relation to said conduit for leading off the lighter gas, means for subjecting the heavier gas to further centrifugal force including a sharply curved conduit extending outwardly from the axis of the drum, and means for separately discharging the heavier and lighter gases after such further action.

11. In a centrifugal separator, a rotatable drum provided with means including outwardly extending sharply curved converging conduits for subjecting a mixture of gases or the like to centrifugal force and with means including a suction producing device arranged to one side of said conduits for leading off the lighter gas or substance after centrifugation, and means for separately leading off the heavier gas or substance after centrifugation.

12. In a device for separating constituents of a mixture of gases or the like by centrifugal force, a rotatable drum, a casing surrounding said drum, and means forming a seal between said casing and drum, said means being operable to impart centrifugal force to a body of fluid to prevent the escape of fluid from the casing and the entrance of external gas.

In testimony whereof, I have signed my name to this specification.

EDOARDO NATALE MAZZA.